United States Patent
Kim et al.

(10) Patent No.: US 11,177,502 B2
(45) Date of Patent: Nov. 16, 2021

(54) SOLID ELECTROLYTE FOR ALL SOLID-STATE LITHIUM-ION BATTERY AND MANUFACTURING METHOD THEREFOR

(71) Applicant: KOREA INSTITUTE OF INDUSTRIAL TECHNOLOGY, Cheonan-si (KR)

(72) Inventors: Ho Sung Kim, Gwangju (KR); Tae Won Kim, Gwangju (KR); Duck Rye Chang, Gwangju (KR); Jong Ho Lee, Gwangju (KR); Kyeong Wan Kim, Gwangju (KR); Min Young Kim, Gwangju (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 301 days.

(21) Appl. No.: 16/249,687

(22) Filed: Jan. 16, 2019

(65) Prior Publication Data

US 2019/0148771 A1    May 16, 2019

Related U.S. Application Data

(62) Division of application No. 14/902,488, filed as application No. PCT/KR2014/005739 on Jun. 27, 2014, now abandoned.

(30) Foreign Application Priority Data

Jul. 4, 2013   (KR) .................. 10-2013-0078499

(51) Int. Cl.
*H01M 10/0562* (2010.01)
*H01M 10/0525* (2010.01)
(Continued)

(52) U.S. Cl.
CPC ....... *H01M 10/0562* (2013.01); *C04B 35/486* (2013.01); *C04B 35/50* (2013.01);
(Continued)

(58) Field of Classification Search
None
See application file for complete search history.

(56) References Cited

U.S. PATENT DOCUMENTS 6,753,110 B1 * 6/2004 Yoo ........................ C04B 35/42
429/231.95
2016/0293947 A1 * 10/2016 Tamura ................... H01M 4/36

FOREIGN PATENT DOCUMENTS

JP    2013256435 A  * 12/2013
JP    2015088423 A  *  5/2015 ............ H01M 4/131

OTHER PUBLICATIONS

Imagawa et al., "Garnet-type Li6.75La3Zr1.75Nb0.25O12 synthesized by coprecipitation method and its lithium ion conductivity", Solid State Ionics 262 (2014) 609-612: doi: 10.1016/j.ssi.2013.10.059 (Year: 2014).*

(Continued)

*Primary Examiner* — Ula C Ruddock
*Assistant Examiner* — Anna Korovina
(74) *Attorney, Agent, or Firm* — Holzer Patel Drennan (57) ABSTRACT

The method for manufacturing a solid electrolyte using an LLZ material for a lithium-ion battery comprises the steps of: providing a starting material in which lanthanum nitrate $[La(NO_3)_3 \cdot 6H_2O]$ and zirconium nitrate $[ZrO(NO_3)_2 \cdot 6H_2O]$ are mixed at a mole ratio of 3:2; forming an aqueous solution by dissolving the starting material; forming a precipitate by putting ammonia, which is a complex agent, and sodium hydroxide, which adjusts the pH of a reactor, into the aqueous solution, mixing the same, and then co-precipitating the mixture; forming a primary precursor powder by clean- (Continued)

ing, drying and pulverizing the precipitate; forming a secondary precursor powder by mixing lithium powder [LiOH.H2O] with the primary precursor powder and ball-milling the mixture so as to solidify the lithium; and forming a solid electrolyte powder by heat-treating the secondary precursor powder.

14 Claims, 7 Drawing Sheets

(51) Int. Cl.
      *C04B 35/486*     (2006.01)
      *C04B 35/626*     (2006.01)
      *C04B 35/50*      (2006.01)
      *C04B 35/64*      (2006.01)

(52) U.S. Cl.
    CPC ...... *C04B 35/6261* (2013.01); *C04B 35/6264* (2013.01); *C04B 35/62645* (2013.01); *C04B 35/64* (2013.01); *H01M 10/0525* (2013.01); C04B 2235/3203 (2013.01); C04B 2235/3227 (2013.01); C04B 2235/3248 (2013.01); C04B 2235/6567 (2013.01); C04B 2235/761 (2013.01); C04B 2235/762 (2013.01); C04B 2235/764 (2013.01); C04B 2235/765 (2013.01); C04B 2235/80 (2013.01); *H01M 2300/0077* (2013.01); *Y02T 10/70* (2013.01)

(56) References Cited

OTHER PUBLICATIONS

Hamao et al., "Synthesis of Garnet-type Li7La3Zr2O12 by Coprecipitation Method", Chem. Lett. 2015, 44, 970-972, doi: 10.1246/cl.150295 (Year: 2015).*

Kim et al., "Cubic phase behavior and lithium ion conductivity of Li7La3Zr2O12 prepared by co-precipitation synthesis for all-solid batteries", Journal of Industrial and Engineering Chemistry 36 (2016) 280 279-283, doi: 10.1016/j.jiec.2016.02.016 (Year: 2016).*

Langer et al., "Synthesis of single phase cubic Al-substituted Li7La3Zr2O12 by solid state lithiation of mixed hydroxides", Journal of Alloys and Compounds 645 (2015) 64-69, doi: 10.1016/j.jallcom.2015.03.209 (Year: 2015).*

Kokal et al., "Sol-gel synthesis and lithium ion conductivity of Li7La3Zr2O12 with garnet-related type structure", Solid State Ionics 185 (2011) 42-46, doi: 10.1016/j.ssi.2011.01.002 (Year: 2011).*

Huang et al., "Effect of sintering temperature on structure and ionic conductivity ofLi7-xLa3Zr2O12-0.5x (x=0.5~0.7) ceramics", Solid State Ionics 204-205 (2011) 41-45, doi: 10.1016/j.ssi.2011.10.003 (Year: 2011).*

Shao et al., "Structure and ionic conductivity of cubic Li7La3Zr2O12 solid electrolyte prepared by chemical co-precipitation method", Solid State Ionics 287 (2016) 13-16, doi: 10.1016/j.ssi.2016.01.042 (Year: 2016).*

* cited by examiner

SOLID ELECTROLYTE FOR ALL SOLID-STATE LITHIUM-ION BATTERY AND MANUFACTURING METHOD THEREFOR

CROSS-REFERENCE TO RELATED APPLICATIONS

The present application is a divisional application of U.S. patent application Ser. No. 14/902,488, filed on 31 Dec. 2015, and titled "Solid Electrolyte for All Solid-State Lithium-Ion Battery and Manufacturing Method Therefor", which is a National Stage entry of International Patent Application No. PCT/KR2014/005739, filed on 27 Jun. 2014, which is specifically incorporated by reference herein for all that it discloses or teaches. The present application further claims priority to Korean Patent Application No. 10-2013-0078499 filed 4 Jul. 2013, which is also specifically incorporated by reference herein for all that it discloses or teaches.

TECHNICAL FIELD

The present invention relates to an electrolyte for an all-solid-state battery, which is a solid electrolyte for a lithium-ion battery and a method of manufacturing the same capable of synthesizing an LLZ material that is a garnet-structure nano solid electrolyte having high ion conductivity and an excellent electrochemical potential window, and a method of manufacturing the same.

BACKGROUND ART

As the exhaustion of fossil fuel and environment issues have been rising in prominence recently, there is a growing interest in new renewable energy and power storage systems. Accordingly, studies on secondary batteries are actively being conducted, while multiple technical problems happen.

For example, due to high energy density, lithium-ion batteries are expected to be applied not only to small IT equipment, such as cellular phones and notebook PCs, but to medium and large-sized batteries for electric cars and power storage. Particularly, it is required to develop a lithium-ion battery with high safety and high energy density for medium and large-sized lithium-ion batteries for electric cars and power storage. Generally, as an electrolyte for a lithium-ion battery, a liquid electrolyte containing an organic solvent is mostly used.

However, a lithium-ion battery using a liquid electrolyte containing an organic solvent has difficulty in guaranteeing safety of the battery against overcharge and thermal properties. In particular, to efficiently deal with an industrial demand for development of medium and large-sized lithium-ion batteries for electric cars and power storage, safety of a battery as well as high energy density is one of crucial issues. Thus, a study for replacing a liquid electrolyte with a solid electrolyte receives attention as an alternative in order to guarantee safety, and studies on optimal fine structures of an interface with an electrode in relation to solid electrolytes are being conducted.

Introducing studies on a solid electrolyte in more detail, conventional solid electrolyte materials are classified into organic (polymer) solid electrolytes and inorganic solid electrolytes. Polymer solid electrolytes are prepared by applying lithium salt, various inorganic fillers and additives to polyethylene oxide (PEO)-based polymers and have limitations in terms of an ion conductivity of about $10^{-5}$ to $10^{-7}$ S/cm at room temperature, a yield of about 0.5 and a potential window of about 0 to 4.5 V. Thus, to improve ion conductivities of the polymer solid electrolytes, the polymer solid electrolytes need to be used in an environment of about 60° C. or higher. However, since the conventional polymer solid electrolytes use lithium salt, which cannot be defined basically as complete solid electrolytes, there are fundamental limitations in resolving safety issues.

Meanwhile, inorganic solid electrolytes are slightly unfavorable for flexibility, unlike organic (polymer) solid electrolytes. However, inorganic solid electrolytes are excellent in safety due to intrinsic nonflammable properties thereof, have a yield of almost 1 due to a characteristic of being conducted by Li single ions, and can maintain a wide potential window range (0 to 5.5 V), although depending on kinds and characteristics of materials, as compared with polymer solid electrolytes. Inorganic solid electrolytes are classified into crystalline materials and amorphous materials, and representative inorganic solid electrolytes have an ion conductivity ranging from about $10^{-3}$ to $10^{-6}$ S/cm in a bulk (monocrystal) state. A solid electrolyte for an all-solid-state lithium-ion battery is required to have an ion conductivity of about $10^{-3}$ S/cm at room temperature for practical use. Solid electrolytes having ion conductivity in this level include sulfide solid electrolytes and oxide solid electrolytes, such as perovskite and NASICON. Studies on oxide solid electrolytes have been actively conducted since 2000. Initial ion conductivity of oxide solid electrolytes has been improved from $10^{-13}$ S/cm up to about $10^{-3}$ S/cm recently.

However, these materials have limitations despite electrochemical properties thereof. Although a perovskite composition ((La, Li)TiO$_3$) and an NASICON composition (LiTi$_2$(PO$_4$)$_3$) exhibit a relatively high ion conductivity of about $10^{-3}$~$10^{-5}$ S/cm, these solid electrolytes have a potential window of about 1.5 to 5.0 V or 2.5 to 5.0 V, exhibiting very unsafe electrochemical properties in negative potential. Thus, these electrolytes have limitations in realizing an all-solid-state lithium-ion battery for high voltage. That is, perovskite and NASICON oxide solid electrolytes are relatively excellent in ion conductivity and yield, but exhibit limited potential window characteristics, having limitations in application to next-generation medium and large-size all-solid-state lithium-ion batteries required to employ a high-energy-density anode material and a low-potential high-capacity cathode material.

Meanwhile, sulfide solid electrolytes also have an improved ion conductivity of up to about $10^{-3}$ S/cm. In particular, Li$_2$S—P$_2$S$_5$ and Li$_2$SSiS have excellent ion conductivity. Furthermore, a sulfide solid electrolyte (Li$_{10}$GeP$_2$S$_{12}$) exhibits an excellent ion conductivity of about $10^{-2}$~$10^{-3}$ S/cm in recent years. Such ion conductivity characteristics of sulfide solid electrolytes are excellent, almost the same as values of conventional organic liquid electrolytes.

However, sulfide solid electrolytes show a basic property of strongly reacting with a high-voltage anode material of 4.0 V and a 0 V cathode material (lithium) and thus have a new problem in controlling an interfacial reaction between solid electrolytes and electrodes. Although most studies are focused on this field, there is not yet any solution for practical use. In particular, sulfide solid electrolytes are required to have high purity, can be treated only under particular conditions, for example, nitrogen or argon atmosphere, and cause environmental problems. Thus, sulfide solid electrolytes are inappropriate as environment-friendly energy storage materials. That is, sulfide solid electrolytes exhibit superior ion conductivity but have extremely high reactivity with electrodes. Thus, despite intensive studies and hard work, sulfide solid electrolytes exhibit electrochemical properties of electrodes and batteries, making it difficult to evolve into commercial materials.

To sum up, as described above, the foregoing polymer solid electrolytes is advantageous in flexibility and workability but have a limitation in improving ion conductivity at room temperature, half ion conductivity and half yield as compared with inorganic materials, and a limitation in application due to a reduced potential window range and use of lithium salt. Thus, there is a need for novel technical suggestions to overcome such limitations.

DISCLOSURE OF INVENTION

Technical Problems

The present invention is to provide a method of improving ion conductivity of a garnet-structure oxide solid electrolyte having a high yield and basically stable potential window properties by using co-precipitation.

Technical Solutions

A method of manufacturing a solid electrolyte for a lithium-ion battery according to the foregoing embodiments of the present invention includes providing a starting material in which lanthanum nitrate [$La(NO_3)_3 \cdot 6H_2O$] and zirconium nitrate [$ZrO(NO_3)_2 \cdot 6H_2O$] are mixed at a molar ratio of 3:2, forming an aqueous solution by dissolving the starting material, forming a precipitate by adding a complex agent (NH4OH) and a solution (NaOH) for pH of a reactor to the aqueous solution in a reactor, followed by mixing and co-precipitation, forming primary precursor powder by washing, drying and pulverizing the precipitate, forming secondary precursor powder by mixing and ball-milling the primary precursor powder with lithium powder [$LiOH \cdot H2O$] to solidify lithium, and forming solid electrolyte powder by heat-treating the secondary precursor powder. Here, the solid electrolyte powder has a composition of $Li_xLa_yZr_zO_{12}$, where x may be 6 to 9 moles, y may be 2 to 4 moles, and z may be 1 to 3 moles.

Further, powder of a solid electrolyte for a lithium-ion battery is formed through heat treatment to have a composition of $Li_xLa_yZr_zO_{12}$, where x is 6 to 9 moles, y is 2 to 4 moles, and z is 1 to 3 moles, and is manufactured using a characteristic that a predominating crystal structure is changed to a cubic structure or tetragonal structure depending on heat treatment temperature.

Here, a predominating crystal structure of the solid electrolyte powder is changed to a cubic structure or tetragonal structure depending on the heat treatment temperature. When the heat treatment temperature is 600 to 1200° C., the solid electrolyte powder has a structure in which a cubic structure and a tetragonal structure coexist. Further, physical properties may be improved using a characteristic that the cubic structure or the tetragonal structure is changed at a calcination temperature the same as or higher than the heat treatment temperature.

For example, the heat treatment temperature may be 700 to 800° C., and the solid electrolyte powder may be changed to have a complete cubic structure and a 90% or higher high-density fine structure by calcination at 1200° C. for about 5 hours. The heat treatment temperature may be approximately 900° C., and the solid electrolyte powder may maintain a complete tetragonal structure and a high-density fine structure with a relative density of 60% or higher by calcination at approximately 900° C. for about 5 hours.

In the manufacturing method, the complex agent may be 5 N ammonia solution, and the complex agent may be added such that the aqueous solution has a pH of 10 to 11. For example, the mixing of the starting material with the complex agent may be performed by titration with the starting material at 4 ml/min simultaneously with titration with the complex agent at 4 ml/min. In the forming of the precipitate, a sodium hydroxide (NaOH) solution may be added for pH adjustment in, and the NaOH solution may be 1 M and be automatically titrated based on a pH change in a co-precipitation reactor with co-precipitation proceeding.

According to an aspect, the method may include putting the solid electrolyte powder into a uniaxial compression molding mold and primary-molding the solid electrolyte powder, compressing the mold, and heat-treating a pellet formed in the compressed mold to form high-density pellets.

Advantageous Effects

As described above, according to embodiments of the present invention, a garnet-structure oxide solid electrolyte (LixLayZrzO12) may be manufactured using co-precipitation.

Further, a particular crystal structure (cubic or tetragonal) of a solid electrolyte material may be realized using co-precipitation under different heat treatment conditions, and a solid electrolyte with a cubic structure or tetragonal structure may be manufactured by controlling calcination conditions. The solid electrolyte with the cubic or tetragonal structure has an ion conductivity of about $10^{-3}$ S/cm or higher at room temperature. In particular, using powder with a cubic structure makes it possible to manufacture high-density solid electrolyte pellets at 1200° C. and to manufacture a solid electrolyte material having a remarkably high bulk ion conductivity ($\sigma_b$) of $2.426 \times 10^{-3}$ S/cm at room temperature.

DETAILED DESCRIPTIONS OF EXEMPLARY EMBODIMENTS

Hereinafter, embodiments will be described in detail with reference to the accompanying drawings, but the present invention is not limited or restricted by the embodiments. In the description of the embodiments, detailed descriptions of known functions or configurations may be omitted to clarify the gist of the present invention.

Figure 1:
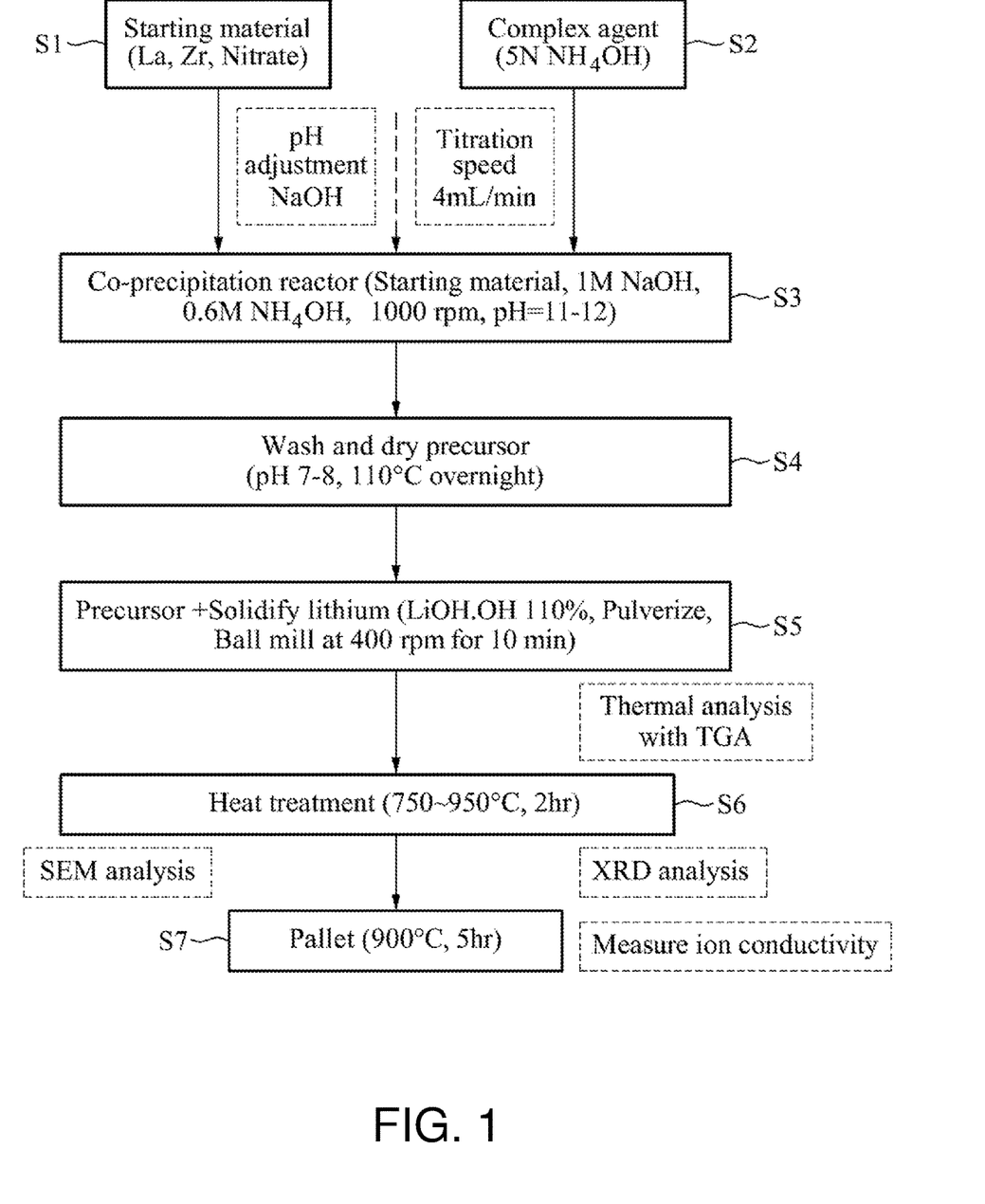
FIG. 1 is a flowchart illustrating a method of manufacturing a solid electrolyte according to the present invention.

To briefly introduce this specification, FIG. 1 illustrates a manufacture process using a co-precipitation method according to the present invention; Example 1 identifies excellence of the co-precipitation method adopted in the present invention through comparison between thermal properties of a co-precipitated precursor mixed with lithium and a precursor prepared by a conventional solid-phase method before heat treatment; Example 2 identifies dominant crystal structures of synthesized powder by heat treatment temperature; and Example 3 identifies detailed conditions (heat treatment conditions) for dominant crystal structures of solid electrolyte sheets (pellets)

First, FIG. 1 illustrates a method of preparing a solid electrolyte material (LixLayZrzO$_{12}$) with an oxide garnet structure by co-precipitation. A description of the method is made with reference to the drawing. First, a starting material aqueous solution is formed by dissolving a starting material in distilled water (S1). Here, the starting material includes lanthanum nitrate and zirconium nitrate, specifically is formed by mixing La(NO$_3$)$_3$.6H$_2$O and ZrO(NO$_3$)$_2$.6H$_2$O at a molar ratio of 3:2. Then, the starting material is dissolved in 500 ml of distilled water, thereby forming the starting material aqueous solution.

Next, a complex agent is prepared (S2), and the starting material aqueous solution and the complex agent are mixed and co-precipitated in a co-precipitation reactor (S3). Specifically, the complex agent may be an ammonia solution (HN$_4$OH). For example, as the complex agent, a 0.6 M aqueous solution is formed by dissolving a 5 N ammonia solution in 500 ml of distilled water. Further, to adjust pH in the reactor, 1000 ml of a 1 M solution is prepared by dissolving sodium hydroxide (NaOH) powder.

pH in the co-precipitation reactor is adjusted to about 11 using about 500 ml of distilled water and prepared NaOH and speed of an impeller of the co-precipitation reactor is set to about 1000 rpm. When a co-precipitation reaction is initiated, titration with the starting material is performed at about 4 ml/min, simultaneously with titration with the ammonia solution prepared as the complex agent at the same speed of 4 ml/min. Further, to adjust the pH in the reactor with the co-precipitation reaction proceeding, titration with the 1 M NaOH solution prepared above is set to be automatically performed according to a pH change in the co-precipitation reactor. Subsequently, after the co-precipitation reaction is completed, additional stirring is performed at a constant impeller stirring speed (1000 rpm) for 24 hours.

Next, the produced precursor is washed, dried and pulverized (S4). Specifically, the precipitate resulting from the co-precipitation reaction is washed a plurality of times with distilled water to a pH of about 7 to 8. The completely washed precipitate is dried overnight in a general dryer at about 110° C., thereby preparing primary precursor powder. Here, the primary precursor contains no lithium and is represented by a composition of La$_3$Zr$_2$(OH)$_x$.

Next, lithium is solidified in the primary precursor powder to form secondary precursor powder (S5). Specifically, the primary precursor and lithium powder (LiOH.H$_2$O) are prepared at a certain ratio and uniformly mixed using an oil-based ball mill, thereby forming the secondary precursor powder.

Subsequently, the lithium-solidified secondary precursor powder is subjected to heat treatment at 600, 700, 800, 900, 1000, 1100 and 1200° C. each for 2 hours (heating rate of 1° C./min), thereby finally producing seven kinds of brown solid electrolyte powder samples with a garnet structure. Here, the produced solid electrolyte powders have an LLZ structure with a composition of (Li$_x$La$_y$Zr$_z$O$_{12}$), where x is 6 to 9 moles, y is 2 to 4 moles, and z is 1 to 3 moles. Compositions of the solid electrolyte powders prepared by heat treatment temperature are identified through inductively coupled plasma (ICP) analysis, and structures and shapes of the synthesized materials are identified through thermal analysis with thermogravimetry analysis (TGA)/differential scanning calorimetry (DSC), X-ray diffraction (XRD) analysis and scanning electron microscope (SEM) analysis As to be described below with reference to Example 1 and experiment results, powders obtained through heat treatment at 700 to 800° C. or 900° C. have a particular crystal structure (a cubic structure at 800° C. and a tetragonal structure at 900° C., which will be described below) predominating 90% or higher. Thus, each powder sample is formed into pellets for experiments at each temperature. A uniaxial compression molding mold is filled with each powder and subjected to compression at about 80 MPa and room temperature, thereby producing pellets with a diameter of 20 mm and a thickness of 1.5 mm.

Here, pellet molded products manufactured using powders obtained by heat treatment at 700 to 800° C. are calcinated at 1200° C. for 2, 5 and 10 hours, respectively, and pellet molded products manufactured using powders obtained by heat treatment at 900° C. are calcinated at 1200° C. for 2, 5 and 10 hours, respectively, thereby manufacturing solid electrolyte sheets in a pellet form. The respective solid electrolyte pellet samples manufactured under the above conditions are reprocessed into specimens with a regular size, resistances of which are measured using an electrochemical measurement cell manufactured by an alternating current (AC) 2-probe 4-wire method and an impedance (AC impedance) analyzer, Solartron 1260, and ion conductivities of which are calculated by an equation. Further, ion conduction properties are measured separately into bulk resistance ($\sigma_b$) of a pure material of the solid electrolyte pellets and total resistance ($\sigma_t$) including interfacial resistance (polarization resistance) as resistance on an interface between particles.

Figure 2:
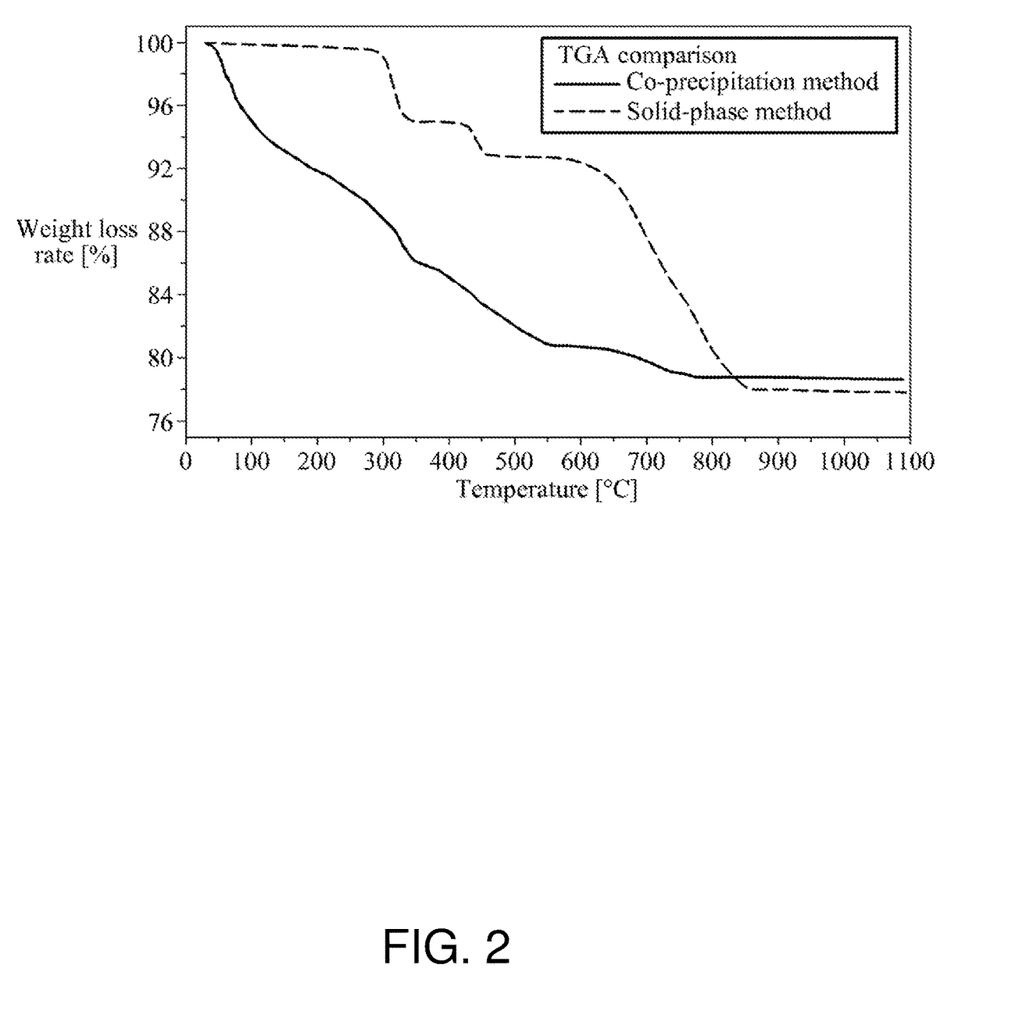
FIG. 2 is a graph illustrating a TGA result of a precursor prepared by co-precipitation and a precursor prepared by a solid-phase method which are not yet subjected to heat treatment according to Example 1.

[Example 1] Comparison Between Thermal Properties of Precursors Prepared by Solid-Phase Method and Co-Precipitation Method First, before describing an embodiment according to the present invention in detail, LLZ precursor powders not subjected to heat treatment were prepared by a solid-phase method and a co-precipitation method, respectively, and thermal properties thereof were compared in Example 1. FIG. 2 is a graph illustrating a result of thermal analysis with TGA of precursors synthesized according to a conventional solid-phase method and the embodiment of the present invention and not yet subjected to heat treatment.

Referring to FIG. 2, the precursor manufactured by the co-precipitation method exhibited remarkably different thermal behavior in a calcination process from that of the precursor manufactured by the solid-phase method. In detail, the precursor manufactured by the co-precipitation method was calcinated at a relatively lower temperature than the precursor manufactured by the solid-phase method. In addition, the precursor by the solid-phase method was completely calcinated at about 850° C., while the precursor by the co-precipitation method was completely calcinated at about 750° C. Thus, it was proved that the co-precipitation method can reduce calcination temperature by about 100° C., facilitating control of size and degree of crystallization of particles. Further, although not shown in the drawing, thermal analysis with DSC identifies that the precursor synthesized by co-precipitation exhibited an exothermic peak at about 617° C., which proved that the precursor is an excellent material that starts crystallization at a low temperature of about 600° C. Thus, the embodiment of the present invention according to the co-precipitation method was proved to be excellent over that by the conventional solid-phase method.

[Example 2] Identification of Predominating Crystal Structures of Precursors by Heat Treatment Temperature The embodiment and results thereof will be described hereinafter.

Figure 3:
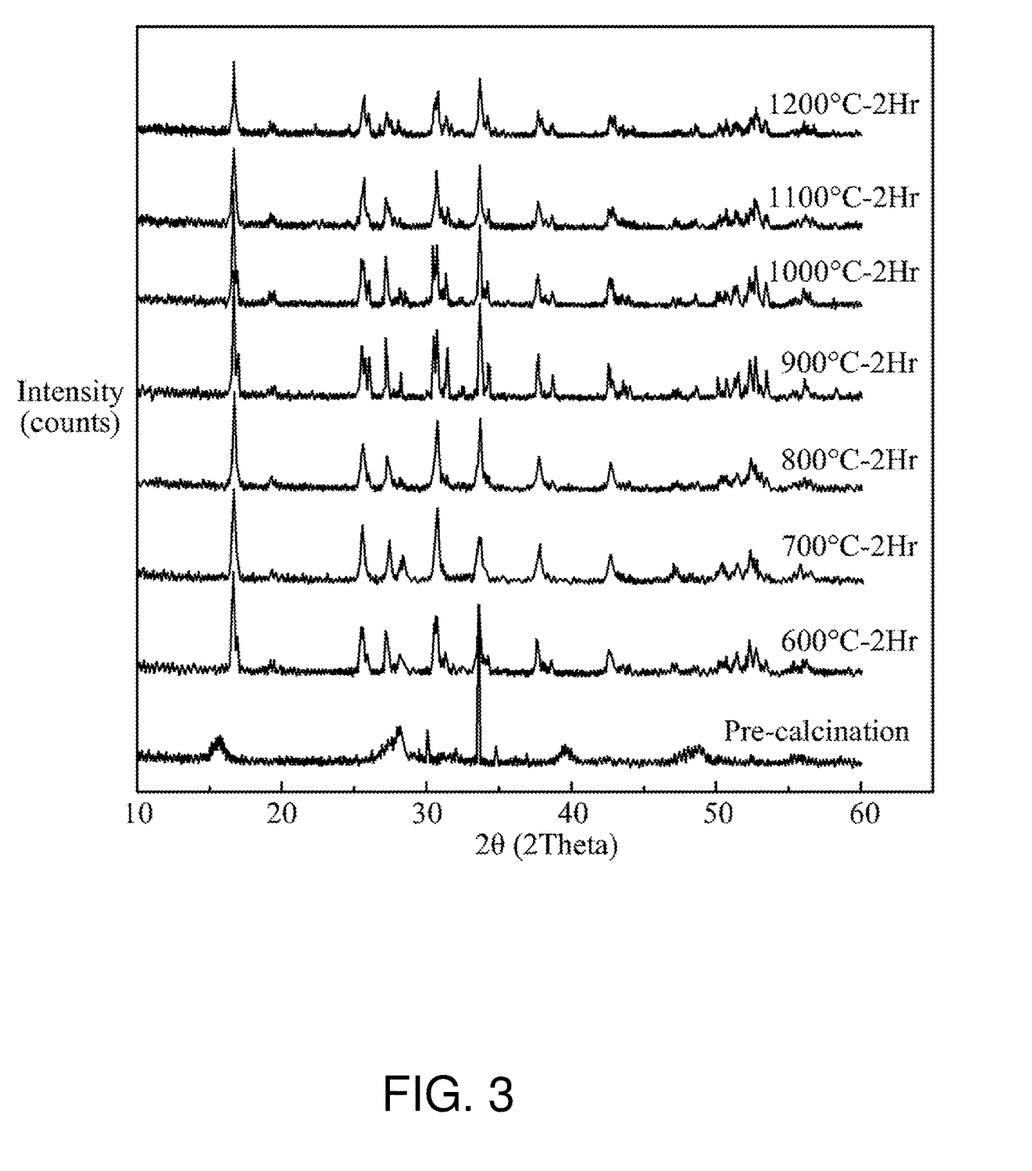
FIG. 3 is a graph illustrating an XRD analysis result of the precursor manufactured by the method of manufacturing the solid electrolyte according to heat treatment temperature according to Example 2.

FIG. 3 is a graph illustrating XRD peaks by heat treatment temperature for solidifying lithium in the precursor manufactured by the co-precipitation method according to Example 1 of the present invention, and Table 1 illustrates an area comparison analysis result of main XRD peaks (004 and 040).

As described above, a solid electrolyte material (Li$_x$La$_y$Zr$_z$O$_{12}$) with an oxide garnet structure was manufactured by a co-precipitation method according to the example of the present invention, in which x is adjusted to 6 to 9 moles, y to 2 to 4 moles, and z to 1 to 3 moles. Then, the solid electrolyte was subjected to heat treatment at 600 to 1200° C. at an interval of 100° C., and a result is illustrated in FIG. 3 and Table 1.

Referring to FIG. 3, the final precursor powders synthesized via heat treatment were characterized by a cubic structure predominating in a particular temperature range (700 and 800° C.) of an entire heat treatment temperature range and by a tetragonal structure in a particular temperature range (900 and 1000° C.). Further, the precursor powders were identified to have two crystal phases coexist in a particular heat treatment temperature range (600, 1100 and 1200° C.). That is, a crystal structure of the solid electrolyte material (Li$_x$La$_y$Zr$_z$O$_{12}$) with the garnet structure greatly depended on heat treatment temperature and time. Thus, in the present invention, as a result of comparing and analyzing areas of peaks in the (004) cubic structure and peaks in the (040) and (004) tetragonal structure in a 2θ (26 to 29°) section obtained by XRD analysis of the powders according to heat treatment conditions, quantitative occupancy ratio of the cubic or tetragonal crystal phase by heat treatment temperature was identified as in Table 1.

TABLE 1

| Calcination Temperature [° C.] | Crystal system | Area (counts × 2θ) | Area ratio (%) |
|---|---|---|---|
| 600° C. | Tetragonal | 12.23 | 82 |
|  | Cubic | 2.69 | 18 |
| 700° C. | Tetragonal | 0.92 | 6 |
|  | Cubic | 14.79 | 94 |
| 800° C. | Tetragonal | 0.97 | 6 |
|  | Cubic | 15.1 | 94 |
| 900° C. | Tetragonal | 12.29 | 94 |
|  | Cubic | 0.83 | 6 |
| 1000° C. | Tetragonal | 12.95 | 90 |
|  | Cubic | 1.39 | 10 |
| 1100° C. | Tetragonal | 10.69 | 84 |
|  | Cubic | 2.11 | 16 |

TABLE 1-continued

| Calcination Temperature [° C.] | Crystal system | Area (counts × 2θ) | Area ratio (%) |
|---|---|---|---|
| 1200° C. | Tetragonal | 4.82 | 60 |
|  | Cubic | 3.16 | 40 |

As a result of XRD analysis illustrated in Table 1, a crystal phase predominantly maintained was selected and subjected to XRD Rietveld analysis, thereby listing lattice constants and crystallite sizes of the synthesized powders by heat treatment temperature in Table 2. As seen from the drawing, a lattice constant of the cubic structure was maintained in a temperature range of 700 to 800° C. When temperature was increased from 800° C. to 900° C., lattice constant a tended to increase while lattice constant c tended to decrease, so that the crystal structure was finally changed drastically from the cubic structure to the tetragonal structure. In addition, under the same temperature condition, crystallite (monocrystal) size was increased by about 20 times from 266 Å to 5625 Å. At a heat treatment temperature of 900 to 1000° C., the tetragonal structure was predominantly maintained. However, at 1000° C. or above, lattice constant a in the tetragonal lattice structure tended to decrease while lattice constant c tended to increase, so that occupancy ratio of the cubic structure gradually increased again over that of the tetragonal structure

TABLE 2

| Calcination Temperature [° C.] | a [Å] | b [Å] | c [Å] | c/a | Crystallite size [Å] |
|---|---|---|---|---|---|
| 600° C. | 13.11094 | 13.11094 | 12.6853 | 0.97 | 893 |
| 700° C. | 13.06004 | 13.06004 | 13.06004 | 1 | 343 |
| 800° C. | 13.03894 | 13.03894 | 13.03894 | 1 | 266 |
| 900° C. | 13.11628 | 13.11628 | 12.66792 | 0.97 | 5625 |
| 1000° C. | 13.11276 | 13.11276 | 12.67586 | 0.97 | 7363 |
| 1100° C. | 13.10015 | 13.10015 | 12.68555 | 0.97 | 770 |
| 1200° C. | 13.09393 | 13.09393 | 12.69302 | 0.97 | 612 |

Further, external appearances of 800° C. heat-treated powder exhibiting a predominating cubic structure in the heat treatment temperature range of the present invention and 900° C. heat-treated powder exhibiting a predominating tetragonal structure were observed with SEM. Referring to an SEM analysis result of the 800° C. and 900° C. heat-treated powders, powder particles (secondary precursor powder particles) prepared according to the present invention were formed of agglomerates of primary particles, in which the powder particles contained about 1-μm or smaller primary particle powder in the cubic structure at 800° C. and about 3-μm or larger primary particle powder in the tetragonal structure at 900° C. That is, with an increase in heat treatment temperature, the crystal phase was changed from the cubic structure to the tetragonal structure, and accordingly primary particle size was substantially increased, which was connected to an increase in crystallite (monocrystal) size of the 900° C. heat-treated powder in Table 1

[Example 3] Heat Treatment Conditions for Cubic/Tetragonal Structures

Figure 4:
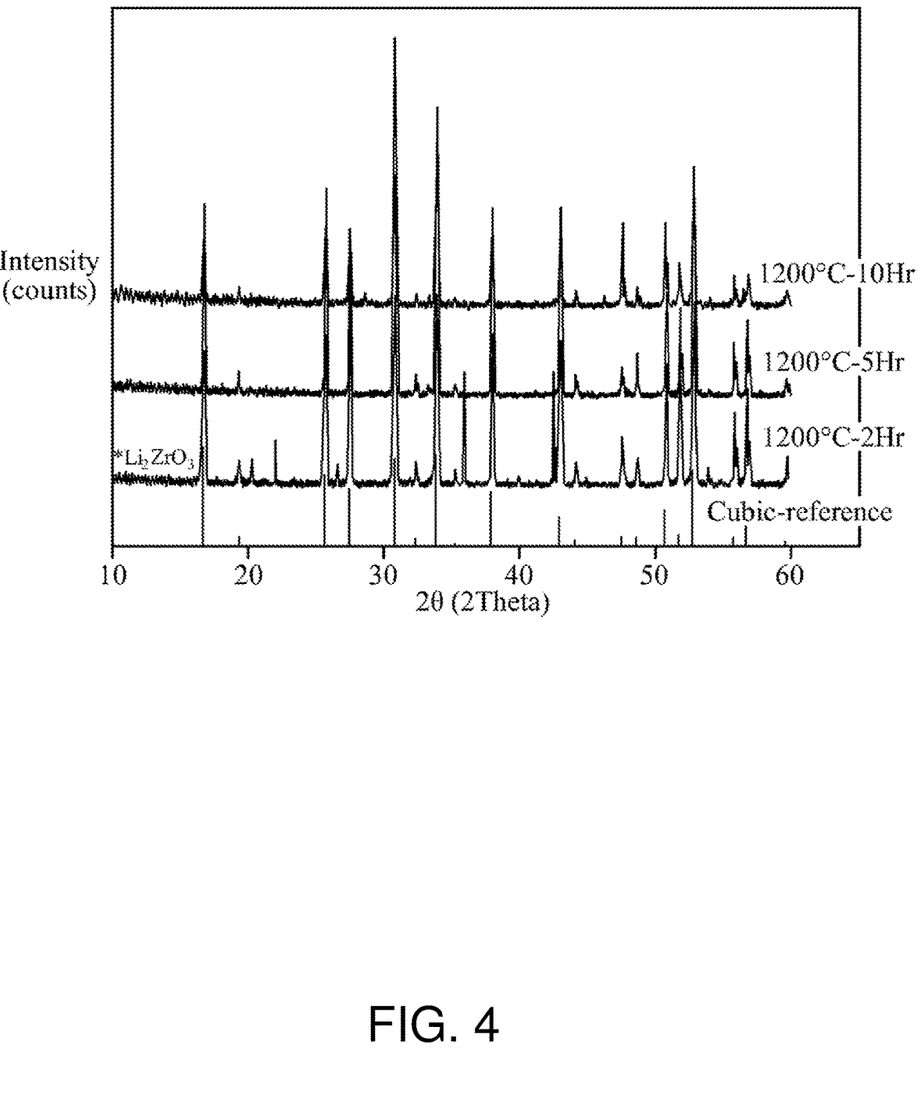
FIG. 4 is a graph illustrating an XRD analysis result showing a cubic structure at 1200° C. according to Example 3.
Figure 5:
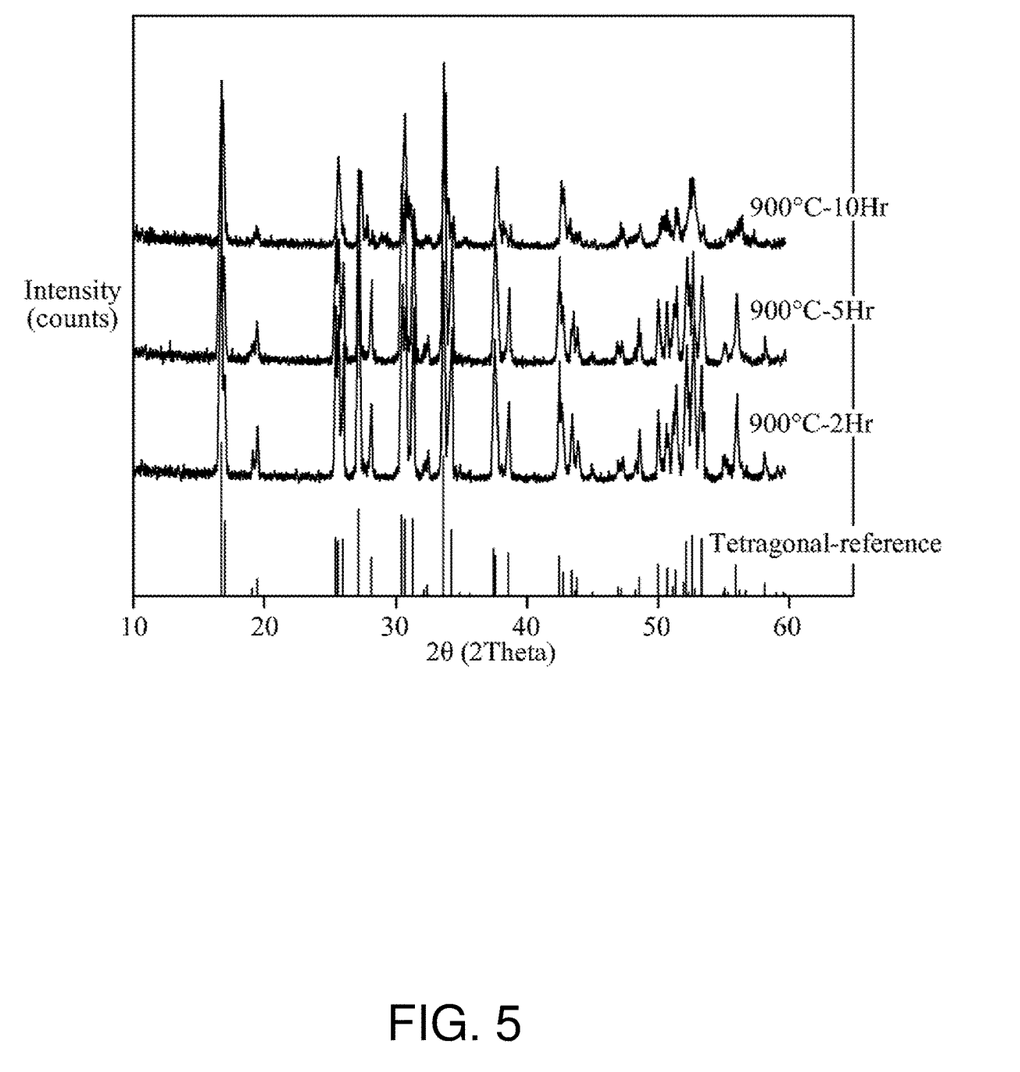
FIG. 5 is a graph illustrating an XRD analysis result showing a tetragonal structure at 900° C. according to Example 3.

Example 3 illustrates a method of manufacturing a pellet molded product (sheet), in which 700° C. and 800° C. heat-treated powders exhibiting the cubic structure or tetragonal structure predominating depending on synthesis and heat treatment conditions for precursors were fully put into pellet molding molds, followed by molding into regular size and thickness and heat treatment at 1200° C. for 2 hours (sample #1), 5 hours (sample #2) and 10 hours (sample #3), thereby manufacturing calcinated pellet products. Also, 900° C. heat-treated powder exhibiting the tetragonal structure predominating was subjected to the same method to obtain molded pellets, followed by heat treatment at 900° C. for 2 hours (sample #4), 5 hours (sample #5) and 10 hours (sample #6), thereby manufacturing pellet-molded calcinated products (sheets). Ion conduction properties of the calcinated pellet samples (6 kinds) manufactured by the above method were measured simultaneously with analyzing characteristics of crystal structures of the samples (FIGS. 4 and 5) and comparing with the XRD analysis result of those of the powder state (FIG. 3 and Table 1). Here, FIG. 4 is a graph illustrating an XRD analysis result showing the cubic structure at 1200° C. according to Example 3, and FIG. 5 is a graph illustrating an XRD analysis result showing the tetragonal structure at 900° C. according to Example 3.

The results showed that all of samples #1, #2 and #3 heat-treated at 1200° C. exhibited a 100% cubic structure. Here, however, that sample #1 heat-treated for 2 hours had peaks containing impurities, and sample #2 heat-treated for 5 hours was identified to have a complete cubic structure without impurities, showing that intensities of the peaks were considerably increased to increase crystal properties. However, sample #3 heat-treated for 10 hours did not change in crystal phase but had considerably reduced intensities of major XRD peaks as compared with sample #2, and thus it was estimated that there was a change in crystallite (monocrystal) size. Further, although not shown in the drawings of the present invention, XRD analysis identified that samples heat-treated at 1200° C. for 6 hours and 8 hours did not change in crystal structure but had impurities mostly in a form of La2ZrO3 and reduced intensities of XRD peaks as compared with the sample calcinated for 5 hours. As a result, it was identified that forming a cubic crystal structure by five-hour calcination is the most favorable for improvement in ion conductivity.

In addition, behaviors of the crystal structure of samples #4 and #5 heat-treated at 900° C. were significantly different from those of the cubic structure of samples #1, #2 and #3. That is, samples #4 and #5 were characterized by the tetragonal structure predominating almost 100%, which is almost the same as the crystal structure of the powder obtained by heat treatment at 900° C. (see FIG. 3 and Table 1), while sample #6 was identified to have the cubic structure predominating about 88%. That is, when the synthesized solid electrolyte powder with the tetragonal structure at 900° C. was formed into a pellet molded product and subjected to sufficient heat treatment for a long time of 10 hours or longer, the tetragonal structure was changed to the cubic structure.

Figure 6:
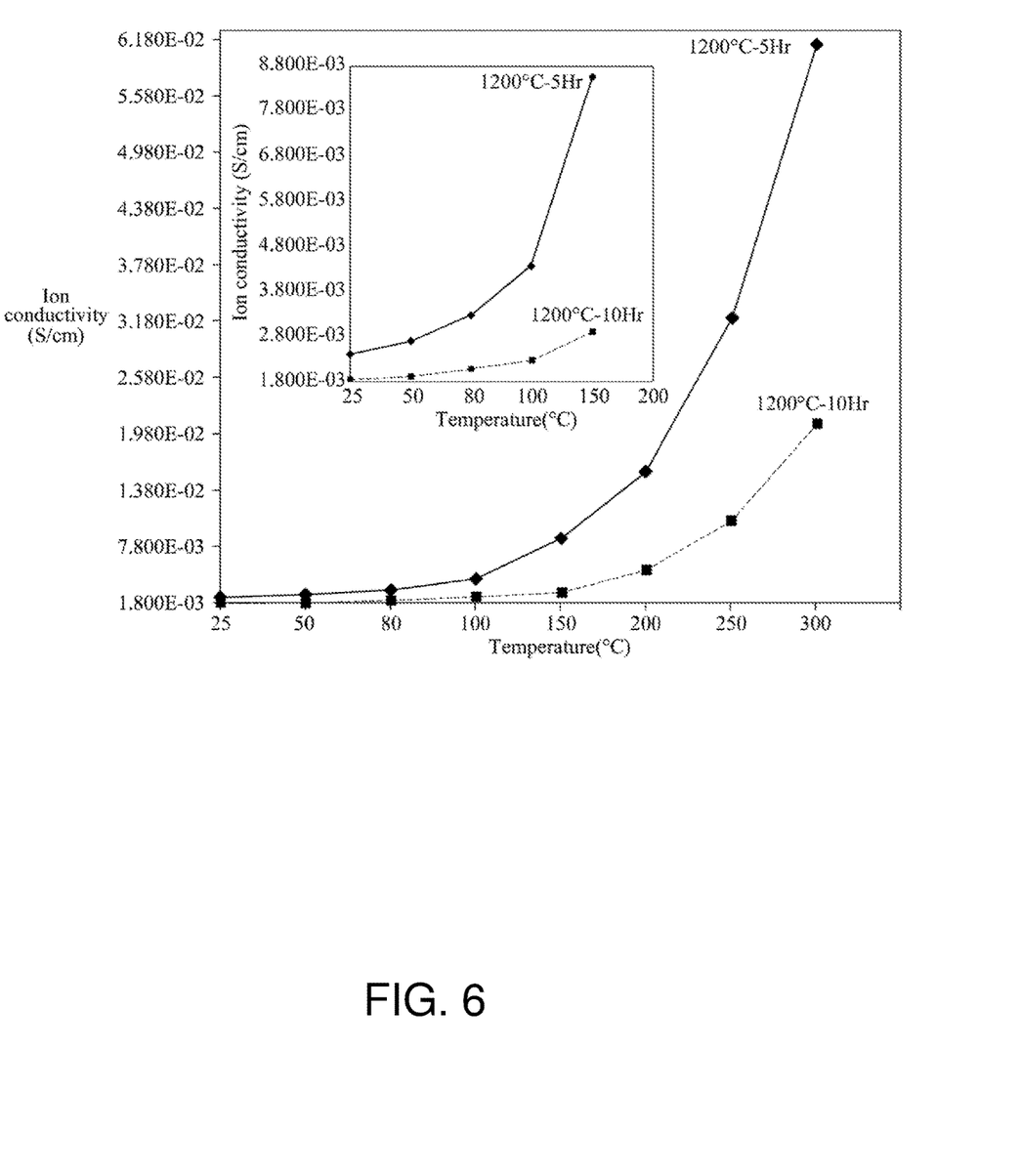
FIG. 6 is a graph illustrating a result of measuring ion conductivity of a cubic structure at 1200° C.
Figure 7:
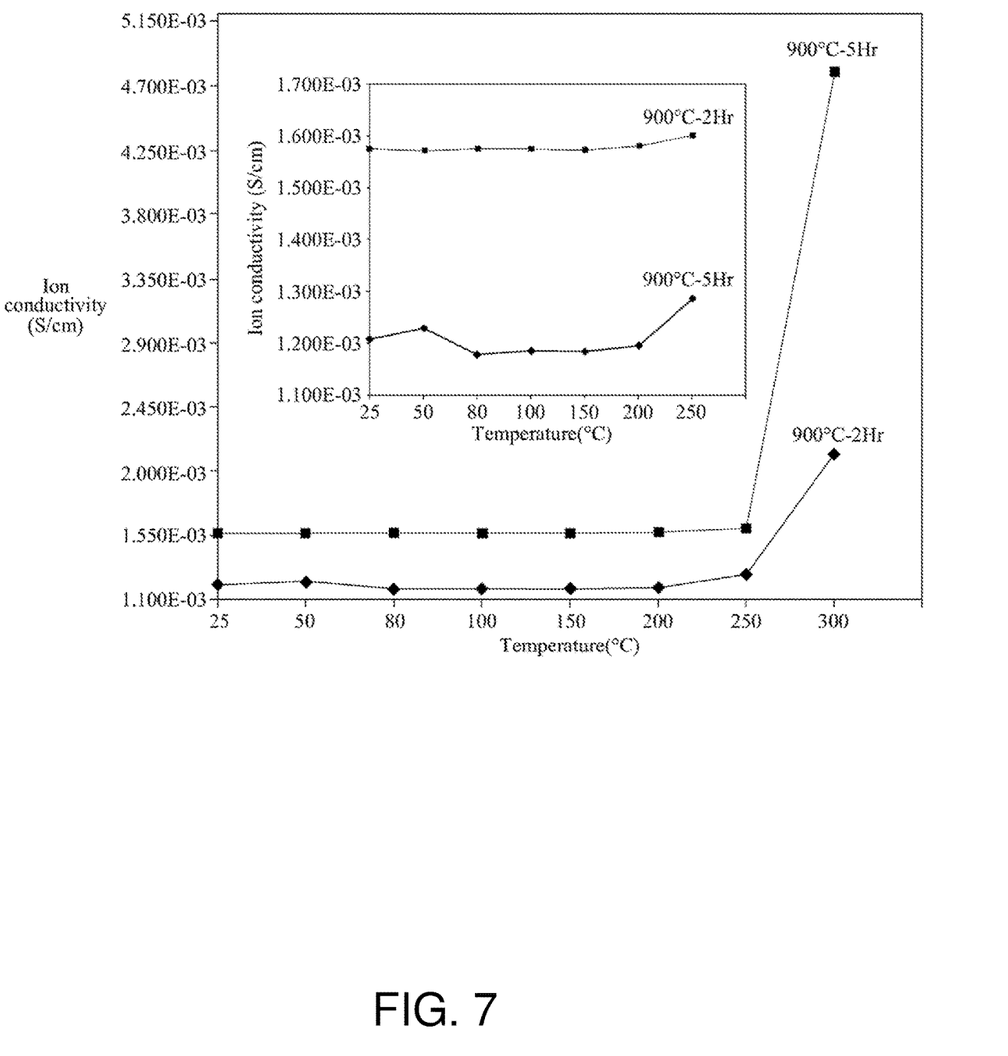
FIG. 7 is a graph illustrating a result of measuring ion conductivity of a tetragonal structure at 900° C.

Further, as a result of measuring ion conduction properties of the finally obtained pellet molded product samples (6 kinds) according to the present invention, ion conductivities of the samples heat-treated at 1200° C. (3 kinds) are shown in FIG. 6, and ion conductivities of the samples heat-treated at 900° C. (3 kinds) are shown in FIG. 7.

As seen from the drawing, since ion conductivity (bulk, $\sigma_b$) of a pellet molded product with the cubic structure heat-treated at 1200° C. for 5 hours was higher than that of a specimen heat-treated at the same temperature for 10 hours in an entire ion conductivity measurement temperature range (from room temperature to 300° C.), calcination time in heat treatment is preferably about 5 hours. Further, bulk ion conductivities ($\sigma_b$) and total ion conductivities ($\sigma_t$) including inter-particle polarization resistance at room temperature and 300° C. are summarized by calcination condition.

TABLE 3

| Pellet calcination conditions | 25° C. | | 300° C. | |
|---|---|---|---|---|
| | Bulk (S/cm) | Total (S/cm) | Bulk (S/cm) | Total (S/cm) |
| 1200° C., 2 Hr | $2.087 \times 10^{-3}$ | $8.060 \times 10^{-5}$ | $4.815 \times 10^{-2}$ | $4.606 \times 10^{-2}$ |
| 1200° C., 5 Hr | $2.426 \times 10^{-3}$ | $3.197 \times 10^{-4}$ | $6.122 \times 10^{-2}$ | $6.016 \times 10^{-2}$ |
| 1200° C., 6 Hr | $1.502 \times 10^{-3}$ | $1.072 \times 10^{-4}$ | $4.165 \times 10^{-2}$ | $4.081 \times 10^{-2}$ |
| 1200° C., 8 Hr | $1.522 \times 10^{-3}$ | $6.230 \times 10^{-5}$ | $4.273 \times 10^{-2}$ | $4.036 \times 10^{-2}$ |
| 1200° C., 10 Hr | $1.864 \times 10^{-3}$ | $1.383 \times 10^{-5}$ | $2.081 \times 10^{-2}$ | $1.879 \times 10^{-2}$ |

TABLE 4

| Pellet calcination conditions | 25° C. | | 300° C. | |
|---|---|---|---|---|
| | Bulk (S/cm) | Total (S/cm) | Bulk (S/cm) | Total (S/cm) |
| 900° C., 2 Hr | $1.2083 \times 10^{-3}$ | $5.5780 \times 10^{-6}$ | $2.1304 \times 10^{-3}$ | $9.1197 \times 10^{-4}$ |
| 900° C., 5 Hr | $1.5766 \times 10^{-3}$ | $9.6084 \times 10^{-6}$ | $4.8039 \times 10^{-3}$ | $3.4086 \times 10^{-3}$ |
| 900° C., 10 Hr | $1.8770 \times 10^{-3}$ | $6.6686 \times 10^{-6}$ | $6.0230 \times 10^{-3}$ | $4.6980 \times 10^{-3}$ |

Ion conductivities of the samples heat-treated at 900° C. for 2 hours (sample #4), 5 hours (sample #5) and 10 hours (sample #6) by the same method were listed in Table 4. In comparing ion conductivities of samples having two kinds of crystal structures at room temperature, ion conductivity ($\sigma_b = 2.426 \times 10^{-3}$ S/cm) of a typical sample (sample #2) exhibiting the cubic crystal structure in calcination at 1200° C. was higher than ion conductivity ($\sigma_b = 1.864 \times 10^{-3}$ S/cm) of a typical sample (sample #5) exhibiting the tetragonal crystal structure in calcination at 900° C.

As seen from FIG. 7 and Table 4, when the synthesized precursor was subjected to first heat treatment at 900° C. and molded into a pellet sheet, followed by second calcination at 900° C. for 10 hours, the crystal structure was changed from the tetragonal structure to the cubic structure predominating about 88%, and accordingly ion conductivity is also increased.

Cross sections of the pellet molded products obtained via calcination at 1200° C. (for 5 hours) and 900° C. (for 2 hours) were observed with SEM. The product obtained via calcination at 1200° C. (for 5 hours) was identified to have a more close high-density fine structure, and it is considered that calcination properties of such a high-density solid electrolyte had crucial effect on improvement in ion conductivity. Further, relative densities of the pellets obtained via calcination at 1200° C. for 2 hours, 5 hours, 8 hours and 10 hours were 91%, 92%, 98%, 82%, respectively, and relative densities of the pellets obtained via calcination at 900° C. for 2 hours, 5 hours and 10 hours were identified as relatively low values of 61%, 68% and 60%, respectively. These results are exactly the same as SEM analysis results of the calcinated pellets.

The above results showed that although the pellet sheet calcinated at 900° C. for 10 hours had a predominating cubic structure and a relative density of about 60%, ion conductivity thereof is increased. Thus, for the ion conductivity of the solid electrolyte according to the present invention, a cubic structure was the most important factor and, as identified by the SEM picture, a method of manufacturing a solid electrolyte sheet with a fine structure having small grain boundary area and high relative density was a crucial factor.

Therefore, when the synthesized powders having a mixed structure of cubic and tetragonal structures obtained via heat treatment at 700 and 800° C. were formed into pellet molded calcinated products by calcination at a high temperature of 1200° C. for about 5 hours in heat treatment, the pellet calcinated products had an almost 100% cubic structure and remarkably improved calcinated density and thus exhibited a highest bulk ion conductivity ($\sigma_b$) of $2.426 \times 10^{-3}$ S/cm at room temperature. Furthermore, regarding total ion conductivity ($\sigma_t$) including polarization resistance of synthesized powder on an interface, a sample obtained via 5-hour heat treatment had was $\sim 10^{-1}$ S/cm higher than a sample obtained via 10-hour heat treatment.

In a case of a specimen obtained by forming the 900° C. heat-treated powder exhibiting a predominating tetragonal structure into a pellet molded product and heat-treating the product at 900° C. for 5 hours, it was considered that crystallite size was significantly increased to cause a considerable decrease in particle interfacial resistance between crystals in particles, thus improving ion conductivity. However, since the pellets were calcinated at relatively low temperature, calcinated density of the calcinated product was considerably reduced to increase polarization resistance between particles, and thus total ion conductivity ($\sigma_t$) of the specimen at room temperature was about $10^{-6}$ S/cm, which was significantly reduced to as compared with the specimen with the cubic structure calcinated at 1200° C. Thus, in manufacturing pellets with a tetragonal structure, it is required to control thickness, particle size and calcination time of the pellets in order to improve calcinated density In addition, the solid electrolyte material with the cubic structure obtained via calcination at 1200° C. according to the present invention had ion conductivity increasing with a rise in measurement temperature, which was a high value of about $10^{-2}$ S/cm at about 300° C. Here, bulk ion conductivity ($\sigma_b = 6.122 \times 10^{-2}$ S/cm) was almost the same as total ion conductivity ($\sigma_t = 6.016 \times 10^{-2}$ S/cm) including resistance on an interface between particles. Although not shown in the drawings, a result of measuring ion conductivities of pellets calcinated at 1200° C. for 2 hours, 6 hours and 8 hours by the same method showed that the ion conductivities had values between ion conductivities of the pellets calcinated for 5 hours and 10 hours and a pallet sample calcinated for 5 hours had a highest ion conductivity. This result substantially corresponded to the XRD structure analysis, identifying that the ion conductivity of the solid electrolyte with the garnet structure significantly relies on a crystal structure, amount of impurities, and relative density and fine structure of pellets.

Moreover, although not shown in the drawings of the present invention, the co-precipitation synthesized powder may be subjected to first heat treatment at 600 to 800° C., thereby forming powder with a cubic or tetragonal structure. However, in the present invention, when a sheet in pellets manufactured using powder in a random crystal structure obtained from first heat treatment of the powder is subjected to additional second heat treatment at 1200° C. for 5 hours, a complete cubic crystal structure and high-density fine structure are formed to achieve highest ion conductivity at room temperature.

According to Example 2 of the present invention, a crystal structure (cubic or tetragonal) of a solid electrolyte material may be realized by particular heat treatment conditions in order to improve ion conductivity of a solid electrolyte with an oxide gargent structure.

According to Example 3 of the present invention, heat treatment conditions for realizing a complete crystal structure by a cubic structure may be present, making it possible to improve ion conductivity.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A method of manufacturing a solid electrolyte for a lithium-ion battery, the method comprising:
   providing a starting material in which lanthanum nitrate [$La(NO_3)_3 \cdot 6H_2O$] and zirconium nitrate [$ZrO(NO_3)_2 \cdot 6H_2O$] are mixed at a molar ratio of 3:2;
   forming an aqueous solution by dissolving the starting material;
   forming a precipitate by adding a complex agent including ammonium hydroxide ($NH_4OH$) to the aqueous solution;
   adding sodium hydroxide (NaOH) to the aqueous solution to adjust pH in a reactor, followed by mixing and co-precipitation of the aqueous solution;
   forming a primary precursor powder by washing, drying and pulverizing the precipitate; and
   forming a secondary precursor powder by mixing and ball-milling the primary precursor powder with lithium powder [$LiOH \cdot H_2O$], wherein the secondary precursor powder undergoes a heat treatment to form a heat-treated solid electrolyte powder having a composition of $Li_xLa_yZr_zO_{12}$, where x is 6 moles to 9 moles, y is 2 moles to 4 moles, and z is 1 mole to 3 moles.

2. The method of claim 1, further comprising:
   forming the heat-treated solid electrolyte powder into a pellet sheet; and
   heat-treating the pellet sheet to change the heat-treated solid electrolyte powder to a crystal structure in which a cubic structure predominates.

3. The method of claim 1,
   wherein the heat-treated solid electrolyte powder is changed to a crystalline structure in which one of a cubic structure and a tetragonal structure predominates depending on a temperature of the heat treatment.

4. The method of claim 1,
   wherein a temperature of the heat treatment is 600° C. to 1200° C., and the heat-treated solid electrolyte powder has a structure in which a cubic structure coexists with a tetragonal structure or one of the cubic structure and the tetragonal structure predominates.

5. The method of claim 1,
   wherein a temperature of the heat treatment is 700° C. to 800° C., and the heat-treated solid electrolyte powder is changed into a material in which a complete cubic structure or tetragonal structure predominates by calcination at 1200° C. for 2 hours to 8 hours.

6. The method of claim 5, wherein the heat-treated solid electrolyte powder is changed into a material having a predominating cubic structure and a fine structure with a high density of 90% or higher by calcination at 1200° C. for 5 hours.

7. The method of claim 1,
wherein a temperature of the heat treatment is approximately 900° C., and the heat-treated solid electrolyte powder is manufactured by calcination at approximately 900° C. for 10 hours or longer.

8. The method of claim 1,
wherein a temperature of the heat treatment is approximately 900° C., and the heat-treated solid electrolyte powder is manufactured by calcination at approximately 900° C. for 2 hours to 10 hours.

9. The method of claim 8, wherein the heat-treated solid electrolyte powder has a predominating tetragonal structure and a high-density fine structure with a relative density of 60% or higher by calcination at approximately 900° C. for 5 hours.

10. The method of claim 1, wherein the complex agent is a 5 N ammonium hydroxide solution, and the sodium hydroxide is added to the aqueous solution such that the aqueous solution has a pH of 10 to 11.

11. The method of claim 10, wherein the mixing of the aqueous solution is performed by titration with the starting material added at 4 mL/min simultaneously with titration of the complex agent added at 4 mL/min.

12. The method of claim 10, wherein the sodium hydroxide is a 1 M solution and is automatically titrated based on a pH change, wherein the reactor is a co-precipitation reactor with co-precipitation proceeding.

13. The method of claim 1, further comprising:
putting the heat-treated solid electrolyte powder into a uniaxial compression mold for molding the heat-treated solid electrolyte powder;
compressing the uniaxial compression mold; and
heat-treating a pellet formed in the compressed uniaxial compression mold at a temperature of the heat treatment to form a high-density fine structure.

14. The method of claim 13, wherein the heat-treated pellet changes to a cubic structure or a tetragonal structure at a calcination temperature that is the same as or higher than the heat treatment temperature.

\* \* \* \* \*